United States Patent
Ohta et al.

(10) Patent No.: US 6,174,262 B1
(45) Date of Patent: Jan. 16, 2001

(54) CONTROL DEVICE FOR AN AUTOMATIC TRANSMISSION

(75) Inventors: Takashi Ohta; Kunihiro Iwatsuki, both of Toyota; Yoji Takanami, Anjyo, all of (JP)

(73) Assignee: Toyota Jidosha Kabushiki Kaisha, Aichi-ken (JP)

( * ) Notice: Under 35 U.S.C. 154(b), the term of this patent shall be extended for 0 days.

(21) Appl. No.: 09/410,019

(22) Filed: Oct. 1, 1999

(30) Foreign Application Priority Data

Oct. 9, 1998 (JP) .................................................. 10-288058

(51) Int. Cl.[7] .................................................. F16H 59/66
(52) U.S. Cl. .............................................. 477/97; 477/120
(58) Field of Search ............................... 477/97, 120, 125

(56) References Cited

U.S. PATENT DOCUMENTS

| 5,531,654 | * | 7/1996 | Ishikawa et al. | 477/120 |
| 5,746,680 | * | 5/1998 | Kato et al. | 477/119 |
| 5,911,771 | * | 6/1999 | Reichart et al. | 477/97 |
| 6,085,137 | * | 7/2000 | Aruga et al. | 477/120 |
| 6,098,005 | * | 8/2000 | Tsukamoto et al. | 477/97 |

FOREIGN PATENT DOCUMENTS

| 09096359 | 4/1997 | (JP) . |
| 10078119 | 3/1998 | (JP) . |

* cited by examiner

*Primary Examiner*—Sherry Estremsky
(74) *Attorney, Agent, or Firm*—Finnegan, Henderson, Farabow, Garrett, and Dunner, L.LP.

(57) ABSTRACT

The present invention offers a control device for an automatic transmission mounted on a vehicle which prevents a shock caused by sudden working of a one-way clutch, when the vehicle accelerates after a deceleration near an intersection or in an intersection. The control device includes an automatic transmission having at least a one-way clutch and achieving a down-shift by applying the one-way clutch, a driving environment detector, a low speed condition detector, and a prohibition means. The driving environment detector detects a driving environment of a vehicle including the automatic transmission. The low speed condition detector detects when the vehicle approaches or enters into a place indicative of a down-shift of the automatic transmission, and the prohibition means prohibits a down-shift caused by applying the one-way clutch when the low speed condition detector detects that the down-shift is indicated.

20 Claims, 7 Drawing Sheets

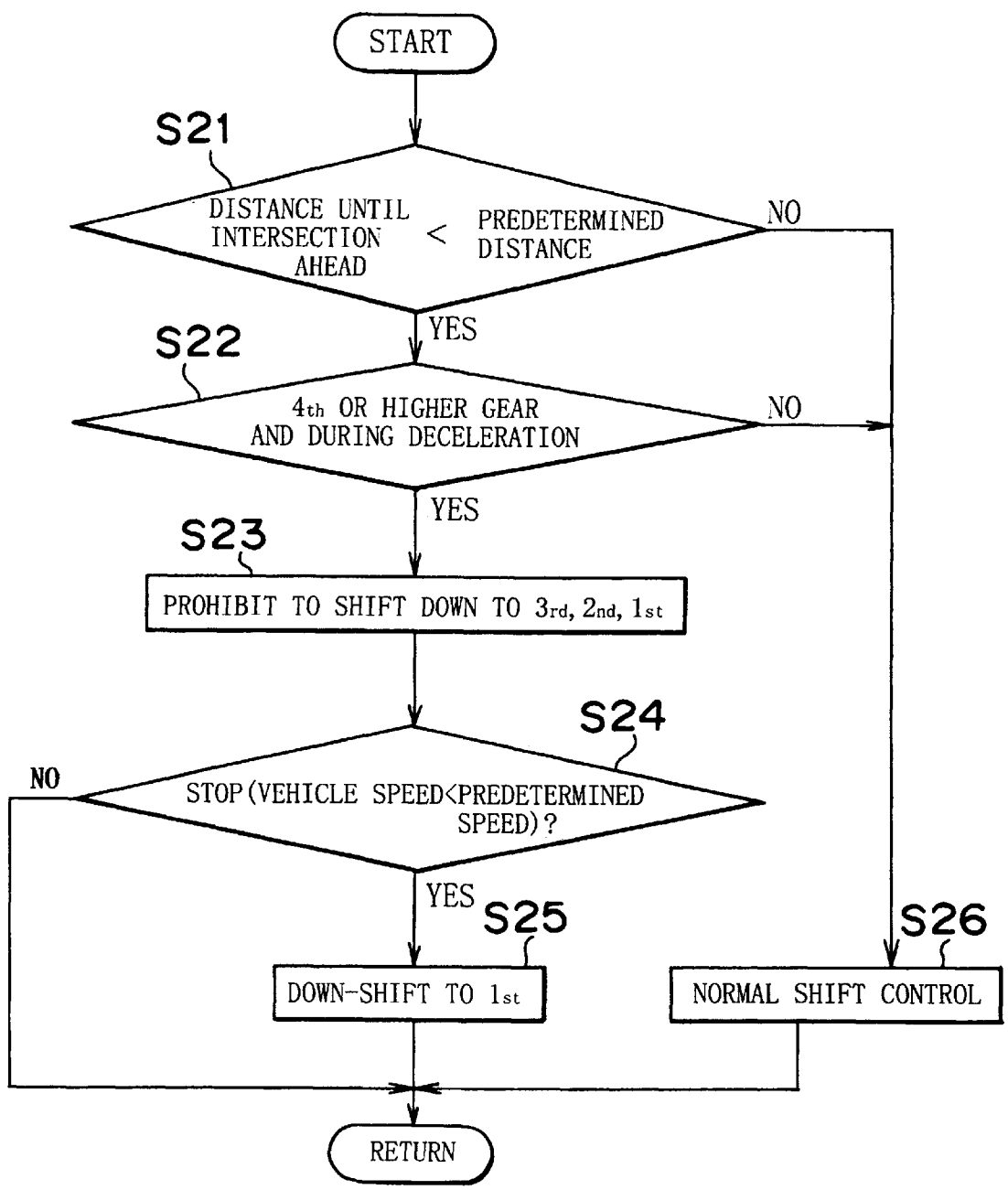

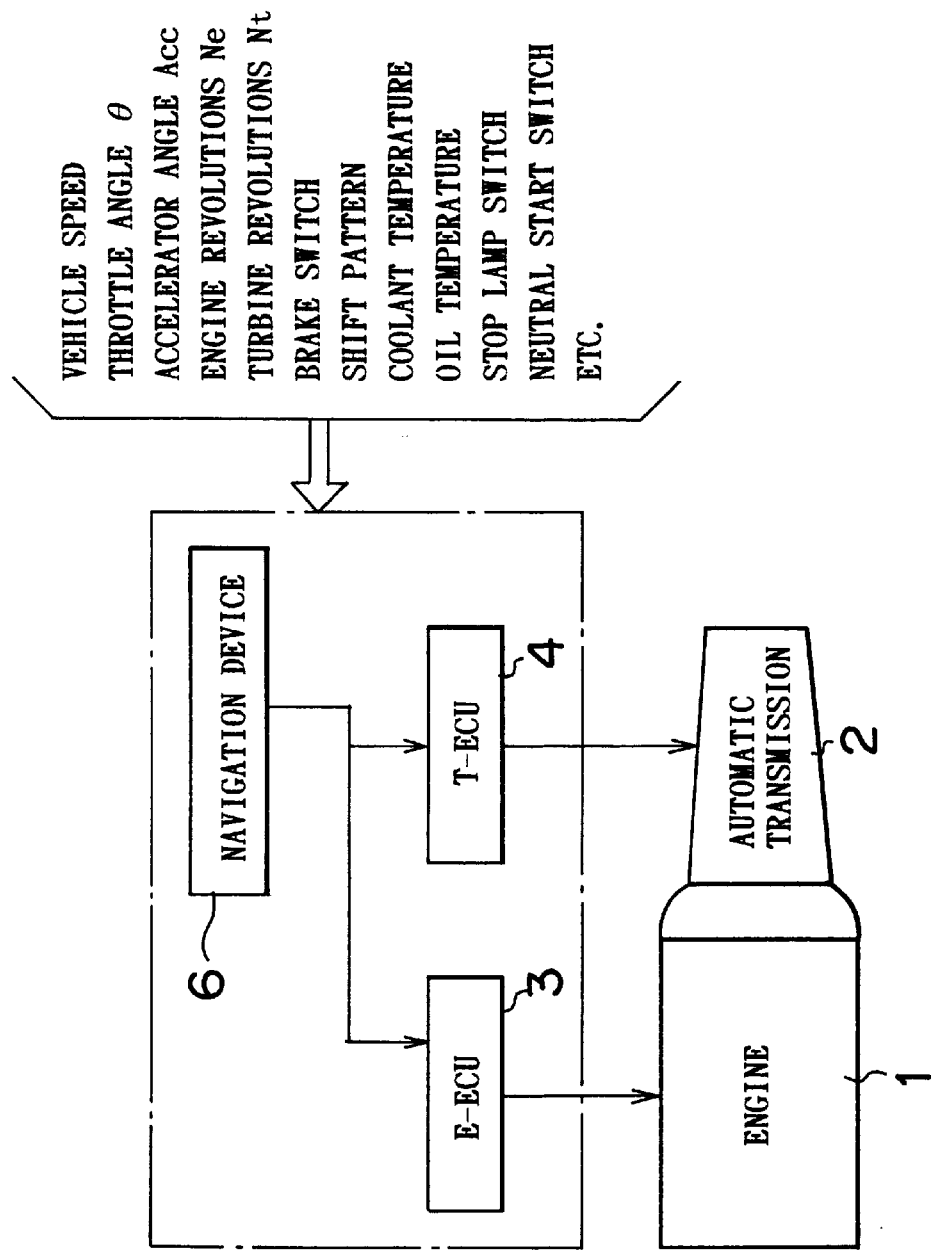

FIG. 5

|   |      | C0 | C1 | C2 | B0 | B1 | B2 | B3 | B4 | F0 | F1 | F2 |
|---|------|----|----|----|----|----|----|----|----|----|----|----|
|   | P    |    |    |    |    |    |    |    |    |    |    |    |
|   | Rev  |    |    | ○  | ○  |    |    |    | ○  |    |    |    |
|   | N    | ○  |    |    |    |    |    |    |    |    |    |    |
| D | 1st  | ○  | ○  |    |    |    |    |    |    | ○  |    | ○  |
|   | 2nd  |    | ○  |    |    |    |    | ○  |    | ○  |    |    |
|   | 3rd  | ○  | ○  |    |    |    | ○  |    |    | ○  | ○  |    |
|   | 4th  | ○  | ○  | ○  |    |    | ◎  |    |    | ○  |    |    |
|   | 5th  |    | ○  | ○  | ○  |    | ◎  |    |    |    |    |    |
| 4 | 1st  | ○  | ○  |    |    |    |    |    |    | ○  |    | ○  |
|   | 2nd  |    | ○  |    |    |    |    | ○  |    | ○  |    |    |
|   | 3rd  | ○  | ○  |    |    |    | ○  |    |    | ○  | ○  |    |
|   | 4th  | ○  | ○  | ○  |    |    | ◎  |    |    | ○  |    |    |
| 3 | 1st  | ○  | ○  |    |    |    |    |    |    | ○  |    | ○  |
|   | 2nd  |    | ○  |    |    |    |    | ○  |    | ○  |    |    |
|   | 3rd  | ○  | ○  |    |    | ●  | ○  |    |    | ○  | ○  |    |
| 2 | 1st  | ○  | ○  |    |    |    |    |    |    | ○  |    | ○  |
|   | 2nd  | ●  | ○  |    |    |    |    | ○  |    | ○  |    |    |
| L | 1st  | ○  | ○  |    |    |    |    |    | ●  | ○  |    | ○  |

CONTROL DEVICE FOR AN AUTOMATIC TRANSMISSION

FIELD OF THE INVENTION

The present invention relates to a control device for an automatic transmission and a control method for the automatic transmission mounted on a vehicle. Especially, the control device and the control method relates to a shift-control of the automatic transmission on the basis of the driving environment as shown by road map information or other things.

BACKGROUND OF THE INVENTION

Recently, not only the driving condition of a vehicle can be detected, but also the driving environment surrounding the vehicle can be detected, such as the road on which the vehicle is driving and is scheduled to drive, the road condition, etc. Furthermore, an engine and/or an transmission and/or other equipment installed on the vehicle can be controlled with electric devices. Not only can a driver's operation be electrically controlled, but the control based on the driving environment can also be realized these days.

One example of a device used to detect the driving environment is a navigation device. This device detects a position of the vehicle by a GPS (Global Positioning System), which uses an artificial satellite or self navigation, and shows the vehicle's position and the scheduled course to the destination on an electronically displayed map. Adding to this, it memorizes information relating to each road and outputs information of the road according to the detected vehicle position or the scheduled course. By using the aforementioned information, the automatic transmission can be controlled to shift appropriately according to the driving environment.

One example of a control device for an automatic transmission controlled on the basis of information acquired by such a navigation device as mentioned above, is disclosed in Japanese Laid-Open Patent Application No. 10-78119. In this control device, a control area which contains an intersection is detected and set by a navigation device or the like, and a higher gear ratio is prohibited in the control device. For example, when a vehicle drives in an intersection or near an intersection ahead, a predetermined high gear is prohibited. That is, the automatic transmission is restrained to be in a lower gear. Consequently, good acceleration performance can be achieved.

According to the Japanese Laid-Open Patent Application No. 10-78119, the automatic transmission is shifted in turn to a lower gear following the vehicle's speed-down, since the control device prohibits a higher gear of the automatic transmission in a road condition, for example in the intersection, where the vehicle would accelerate after decelerating. When the vehicle is required to accelerate during or after passing through the control area such as the intersection, the vehicle is in a power-on condition, and after that the vehicle is in turn up-shifted to a higher gear in accordance with the vehicle's speed-up. In these deceleration-acceleration processes of the vehicle, the automatic transmission is under a coast condition where the automatic transmission is driven by an output shaft. Consequently, if the automatic transmission has a one-way clutch, for example for setting the $1^{st}$ gear, the one-way clutch does not work, that is, it is free during the deceleration of the vehicle.

The one-way clutch has a structure in that, for instance, a plurality of sprags are set between an outer race and an inner race. There is also a roller type of one-way clutch which has a plurality of rollers instead of sprags. When a torque is applied in a predetermined direction from the outer race or the inner race of the one-way clutch, the sprags are locked up between the outer race and the inner race. The outer race and inner race then rotate together as one piece. On the contrary, when the torque is applied in the other direction, the torque can not be transmitted between the outer race and the inner race since the sprags are free between the outer race and the inner race. Consequently, since the one-way clutch works or is free in accordance with the direction of the torque, a gear shift such as to the $1^{st}$ gear is achieved by using the one-way clutch.

If an automatic transmission having a one-way clutch in low gear, for example $1^{st}$ gear, is controlled by the above-mentioned control device, the automatic transmission is under the coast condition by disengaging an acceleration pedal causing a decelerating operation in a predetermined controlled area such as an intersection. The one-way clutch is not only free in the $2^{nd}$ gear, but also is free even if the automatic transmission is down-shifted to the $1^{st}$ gear. The one-way clutch works when the vehicle's speed is nearly zero or creeping with the engine idling. However it does not work when the speed is higher than the aforementioned condition. Consequently, when the acceleration pedal is pushed under a condition where the speed is higher than the low speed mentioned above, the one-way clutch suddenly begins to work following the $1^{st}$ down-shift and an increasing of engine revolutions.

That is, first, the outer race or the inner race relatively rotates against another counterpart without transmitting torque. Next, the torque transmitting direction is reversed and the outer race and the inner race lock up, then both races rotate together or stop as one piece. Then the torque can be transmitted between both races. This means that the inner race suddenly rotates in the reverse direction or stops against the outer race, and the rather high torque including the inertia of the inner race are applied to the outer race. Consequently, the applied torque to the outer race suddenly increases from zero. Then an abrupt shock occurs in the vehicle because of the sudden torque fluctuation to the output shaft of the automatic transmission.

The aforementioned control device has an advantage of improving the acceleration performance passing through an intersection. But on the contrary, in a predetermined area such as the intersection a driver could feel an inevitable shock by the sudden working of the one-way clutch. This could cause the ride quality of the vehicle to worsen.

SUMMARY OF THE INVENTION

It is thus an object of the present invention to solve the aforementioned problems. The present invention provides a control device and a control method for an automatic transmission having at least a one-way clutch and achieving a down-shift by applying the one-way clutch.

To achieve at least a part of the aforementioned objects, a control device and a control method for an automatic transmission of the present invention can be used as described below.

An automatic transmission has at least a one-way clutch and achieves a down-shift by applying the one-way clutch. A control device for the automatic transmission has a driving environment detector, a low speed condition detector, a prohibition means, a speed determinater, and a permission means. The driving environment detector detects the driving environment of a vehicle with the automatic transmission.

The low speed condition detector detects that the vehicle is approaching or entering into a place indicative of a down-shift of the automatic transmission. The prohibition means prohibits a down-shift caused by applying the one-way clutch when the low speed condition detector detects that the down-shift is indicated. The speed determinater determines whether the vehicle speed is lower than a predetermined speed. Furthermore, the permission means permits a down-shift to a next lower gear when the speed determinater determines that the vehicle speed is lower than the predetermined speed.

Since the down-shift caused by applying the one-way clutch is prohibited when the vehicle is approaching or entering into a place indicative of a down-shift of the automatic transmission, the one-way clutch does not work even though torque flow changes from wheel-to-transmission to engine-to-transmission when the vehicle changes from deceleration to acceleration. Consequently, the vehicle's shock caused by applying the one-way clutch can be avoided.

Furthermore, since the vehicle speed is lower than the predetermined speed when a down-shift to the next lower gear is permitted, the one-way clutch applies or will be applied after the automatic transmission is down-shifted. This means that the outer race and the inner race of the one-way clutch rotate at nearly same speed. Then, the torque is transmitted instantly and smoothly from the input side to the output side, even if torque is inputted from the engine to the automatic transmission in order to accelerate again. That is, the one-way clutch is not applied abruptly. Then, the shock of the vehicle can be avoided in the repeated acceleration.

BRIEF DESCRIPTION OF THE DRAWINGS

The above and other objects, features, advantages and technical and industrial significance of this invention will be better understood by reading the following detailed description of a presently preferred embodiment of the invention, when considered in connection with the accompanying drawing, in which:

FIG. 2 is a block diagram showing the control device schematically;

FIG. 5 is a tabular form showing whether each friction device or one-way clutch works or not for setting each shift gear of the automatic transmission.

DESCRIPTION OF THE PREFERRED EMBODIMENTS

Figure 1:
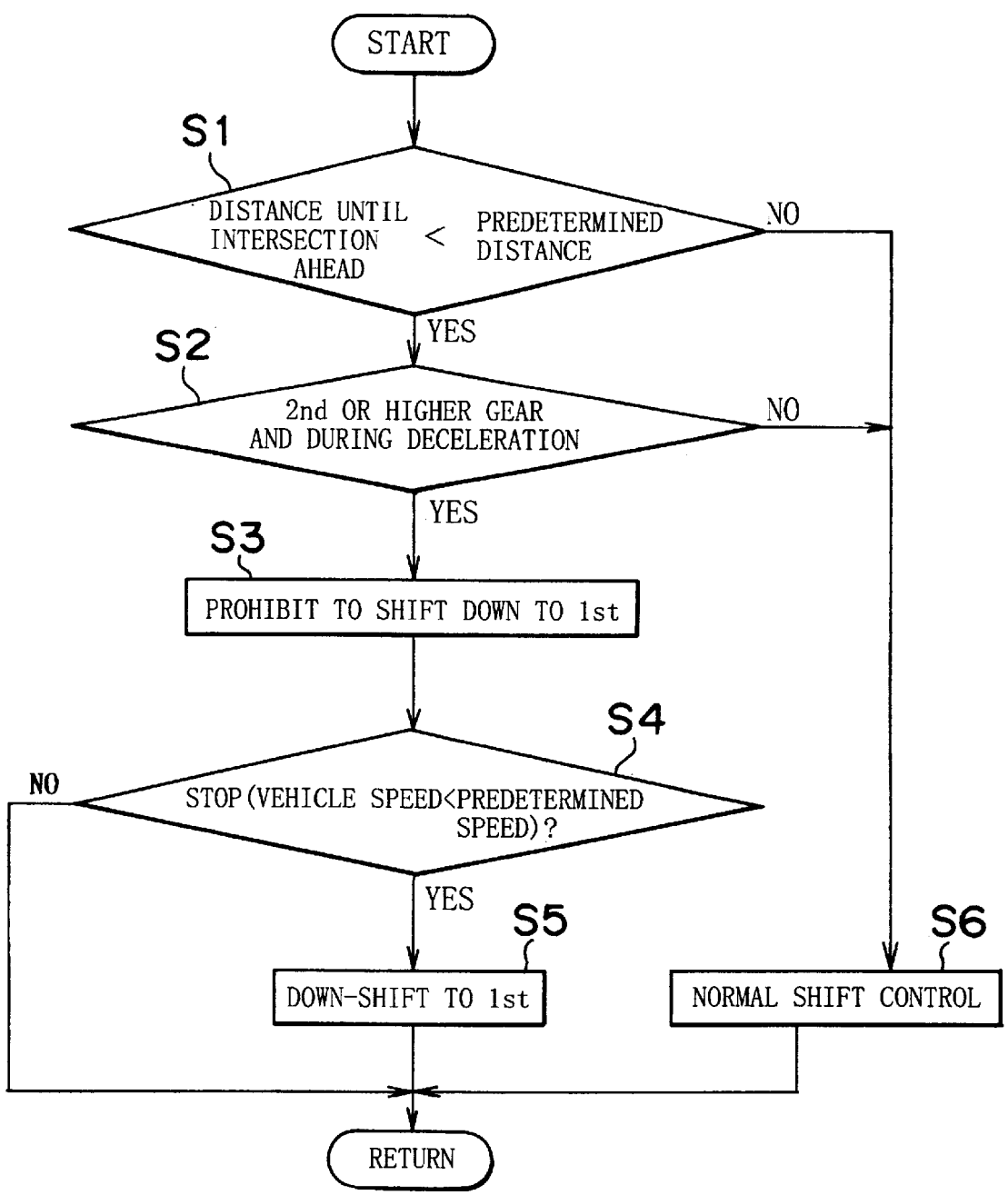
FIG. 1A is a flow chart showing the control of a control device for an automatic transmission, as one embodiment of the present invention.
FIG. 1B is a flowchart showing another control of the control device.
FIG. 1C is a flow-chart showing the other control of the control device.
Figure 1:
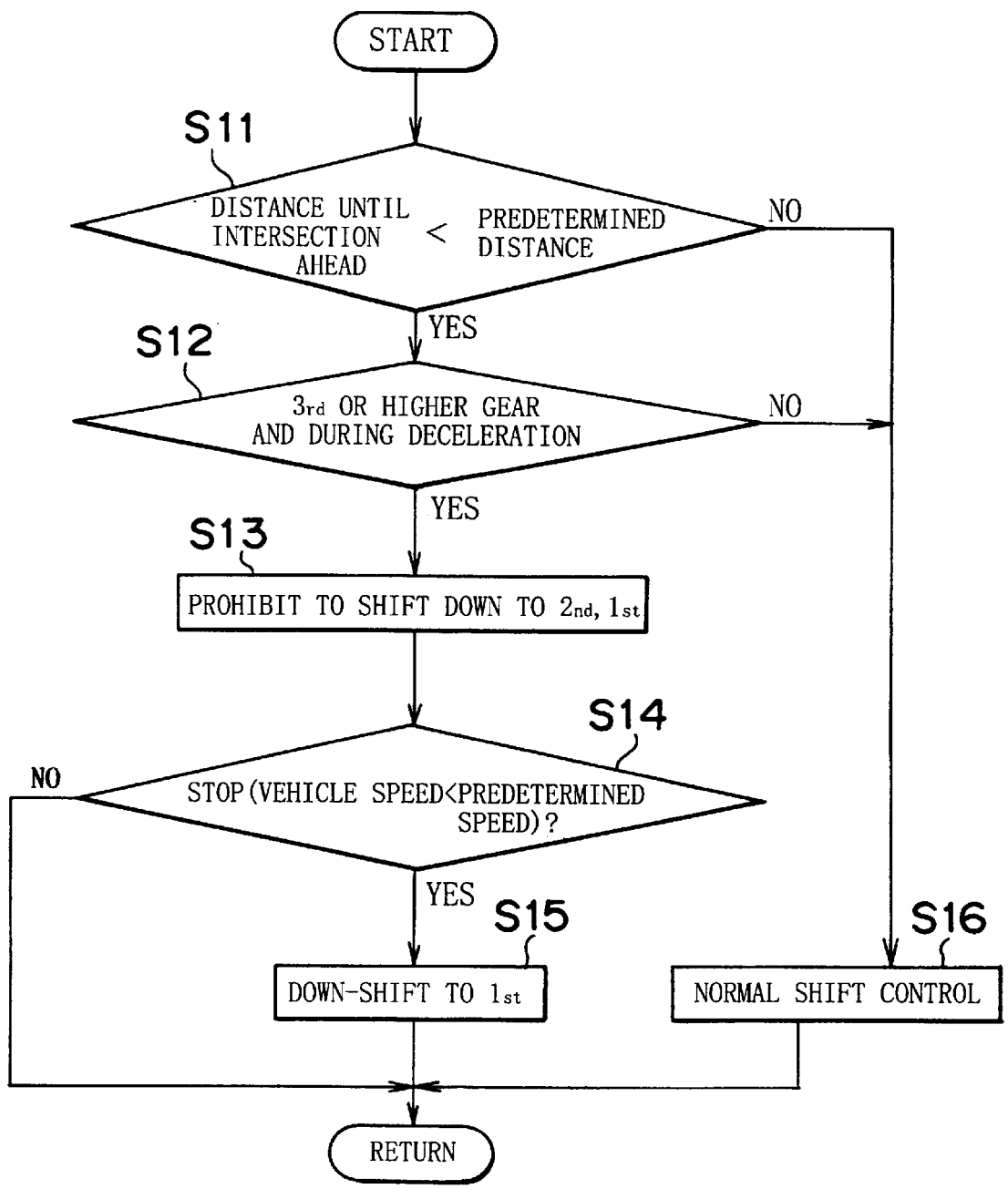

In the following and the accompanying drawings, the present invention will be described in more detail in terms of the embodiments. Initially, the basic structure of a control device concerning this invention is explained. This control device controls a shift gear of an automatic transmission which is driven by a power source of a vehicle. Incidentally, although the power source is shown in FIG. 2 as an internal-combustion engine (from now on only 'engine' is used) 1, it is not limited to this, and an electric motor or a hybrid structure having an electric motor and an engine, or other type of power source is available. Furthermore, the output power of this power source can be electrically controlled. For example, the engine 1 has an electric throttle valve, and fuel is injected into each cylinder of the engine 1.

On the other hand, a gear shift of a transmission can be electrically controlled. The transmission is shown as an automatic transmission 2. The automatic transmission 2 has several one-way clutches for setting the $1^{st}$ gear, the $2^{st}$ gear or the $3^{rd}$ gear as explained in detail later using FIG. 5.

An electronic control unit (E-ECU) 3 for controlling the engine is provided. This E-ECU 3 mainly comprises micro-computers, and computes on the basis of inputted data and previously memorized programs. Based on these computed results, the E-ECU 3 controls the throttle angle θ, amount of fuel injected, ignition timing, etc. Adding to this, an electronic control unit (T-ECU) 4 for controlling the automatic transmission 2 is provided. This T-ECU 4 mainly comprises micro-computers, and the T-ECU 4 computes on the basis of inputted data and previously memorized programs. According to these computed results, the T-ECU outputs gear shift command signals, lock-up command signals, etc. Actuators of the automatic transmission 2 function on the basis of these command signals, and lock-up clutches work or not in response to the command signals.

The above-mentioned E-ECU 3 and E-ECU 4 are connected so that both can communicate together by data. The data which are necessary for output control of the engine 1 are sent from the T-ECU 4 to the E-ECU 3, and the data which are necessary for controlling a gear shift are sent from the E-ECU 3 to the T-ECU 4.

Next, sending of data and the accompanying control are explained as follows. The E-ECU 3 contains an accelerator angle Acc which responds to an operation of an accelerator pedal and a vehicle speed. The throttle angle θ of the electronic throttle valve is controlled by computing on the basis of the accelerator angle Acc. The T-ECU 4 controls a gear-shifting of the automatic transmission 2 by computing on the basis of the accelerator angle θ and the vehicle speed, outputting the command signal, and selecting the shift gear. Furthermore, the command signal for executing a gear shift of the automatic transmission 2 is sent to the E-ECU 3, and a torque reducing control for reducing a torque of the engine 1 for a short time is temporarily executed. This torque reducing control is executed, for example, by a delay angle control of the ignition timing of the engine 1.

Besides, a navigation device 6 is provided for detecting road or other conditions and influencing the control of the engine 1 and/or the automatic transmission 2 according to the circumstances around the vehicle. By using a GPS or a self-navigation system having a magnetic earth sensor or a gyro sensor, this navigation device 6 shows the vehicle's position on an electronic map and guides the vehicle until its destination.

Figure 3:
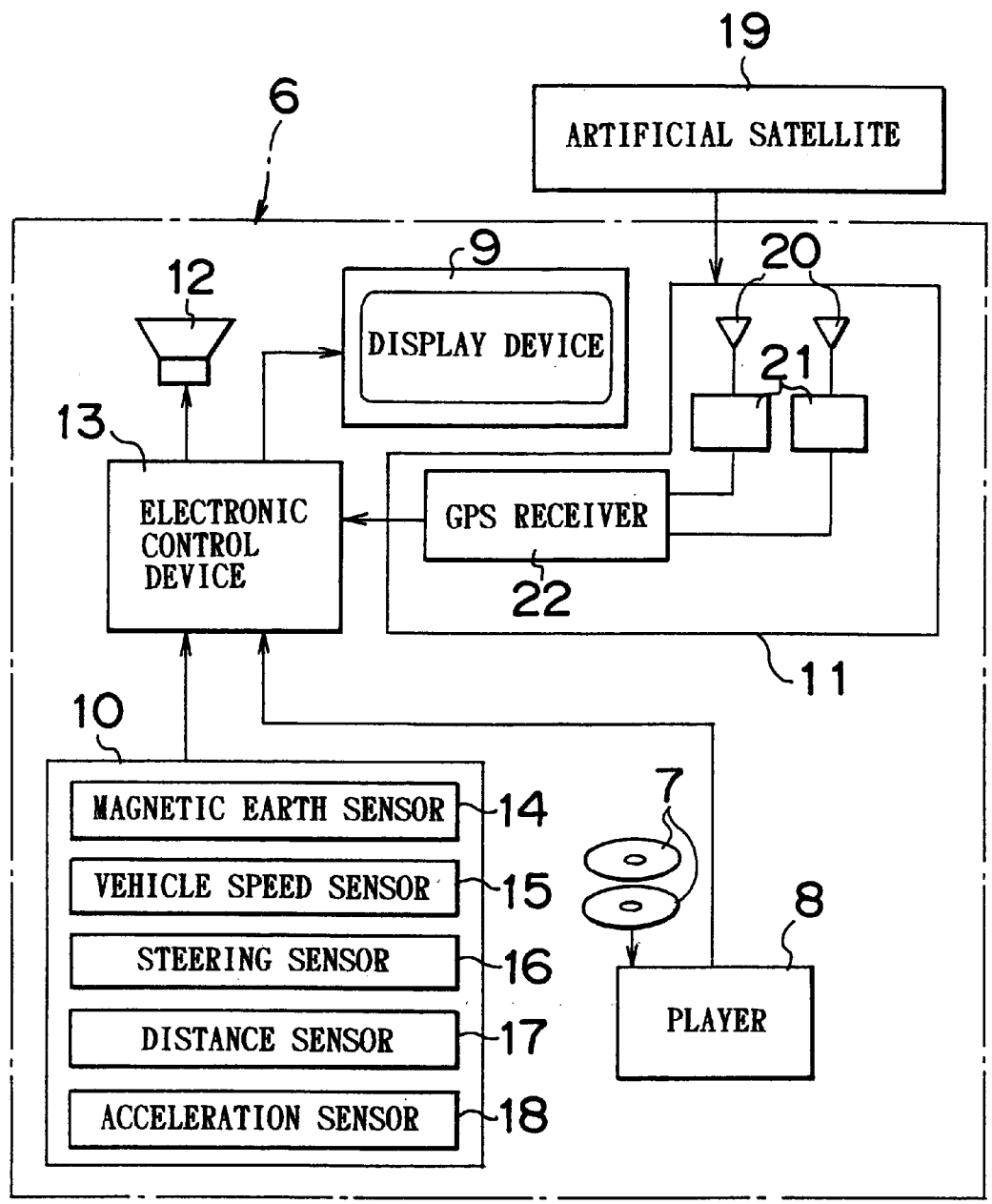
FIG. 3 is a block diagram showing one example of a navigation device in schematic form.

More details are explained by FIG. 3. In the navigation device 6, information recording mediums 7 such as optical discs or magnetic discs, a player 8 for reading the information memorized in the information recording mediums 7, a display device 9 for displaying the information read two-dimensionally or three-dimensionally by the player 8, etc. are provided. Furthermore the navigation device 6 provides the first position detecting device 10 for detecting a present position of the vehicle and a road condition, the second position detecting device 11 and a speaker 12 for notifying a driver of the road condition by voice. A liquid crystal display or CRT (cathode-ray tube) deposited on the side of an instrument panel or a glove box, or an image projection deposited on a front window without impeding good visibility are adopted to the display device 9.

An electronic control device 13 controls the aforementioned player 8, display device 9, the first position detecting device 10, the second position detecting device 11, and a speaker 12. This electronic control device 13 comprises a CPU (Central Processing Unit), a RAM (Random Access Memory), a ROM (Read Only Memory), and microcomputers mainly for input/output interfaces.

The information recording mediums 7 memorize information necessary for the vehicle's driving, for example, a map, the name of each place, road, important buildings and houses, and specific conditions of each road, for instance, whether an intersection is near, whether a road is straight or curved, sloped upward or downward, express or not, paved or not, and other information.

The first position detecting device 10 comprises a magnetic earth sensor 14 for detecting a driving direction of the vehicle, a vehicle speed sensor 15, a steering sensor 16 for detecting an angle of a steering wheel, a distance sensor 17 for detecting a distance between the vehicle and an object surrounding the vehicle, an acceleration sensor 18, etc. Furthermore, the second position detecting device 11 has GPS antennas 20 for receiving electric waves from an artificial satellite 19, amplifiers 21 connected with the GPS antennas 20, and a GPS receiver 22 connected with the amplifiers 21.

As mentioned above, the navigation device 6 can detect the road condition where the vehicle is now positioned or is scheduled to be positioned. Consequently, the engine 1 and/or the automatic transmission 2 can be controlled by using the aforementioned detected data. That is, the data is sent from the navigation device 6 to the E-ECU 3 and the T-ECU 4, and the T-ECU 4 recognizes that the vehicle is approaching the driving environment which indicates a down shift or entering such a driving environment. Then, the T-ECU 4 controls a gear shift or a shift pattern. Specifically, a prohibition of a shift to a lower gear by the working of the one-way clutch is executed. Details are explained later.

Figure 4:
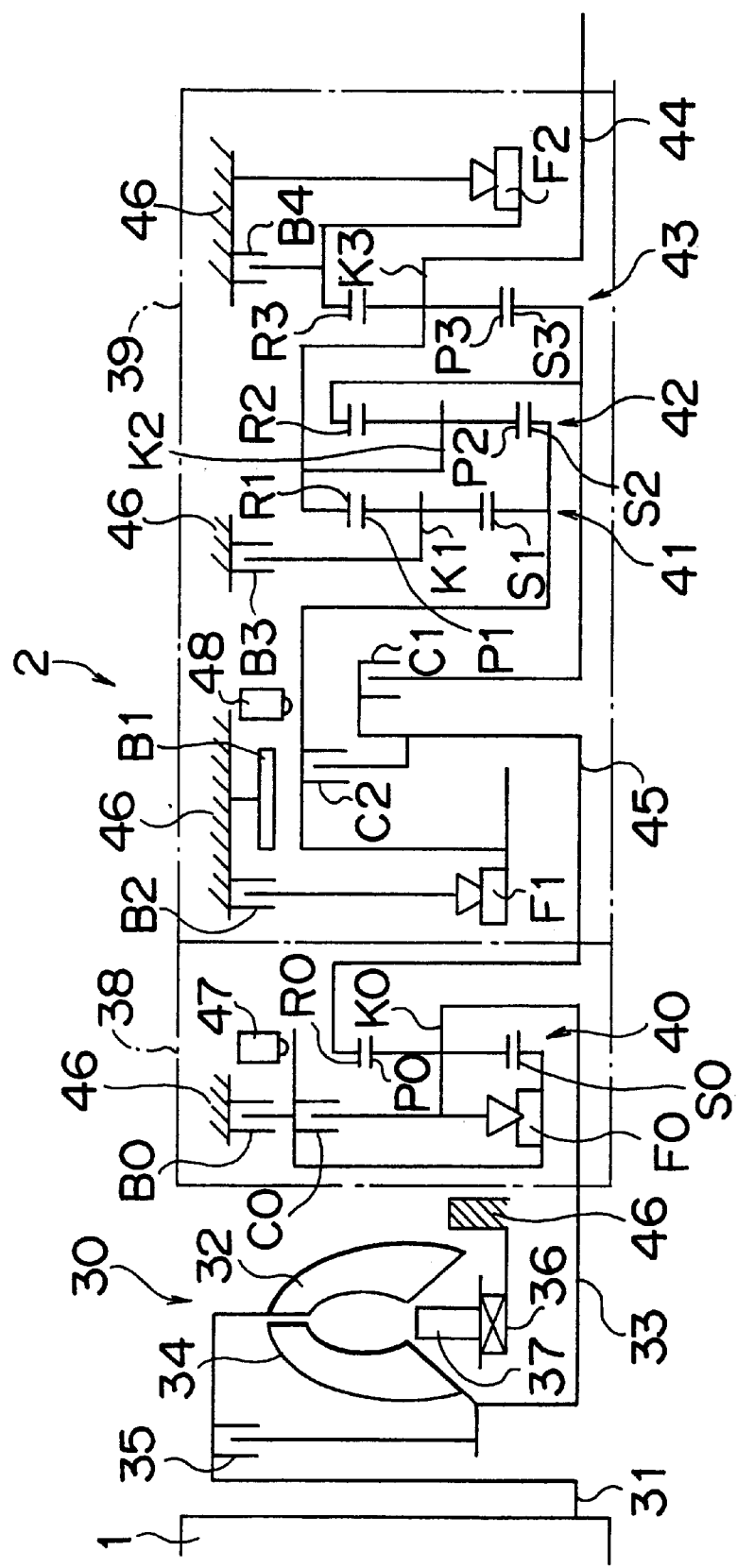
FIG. 4 is a schematic diagram showing a gear train of one example of an automatic transmission.

One example of a structure of the automatic transmission 2 is illustrated by using a schematic diagram in FIG. 4. The automatic transmission 2 shown here is a forward five gear-shift and reverse one gear-shift type, and is connected to the engine 1 by way of a torque-converter 30 included in the automatic transmission 2. The torque-converter 30 comprises a pump-impeller 32 coupled to a crankshaft 31 of the engine 1, a turbine-runner 34 coupled to an input shaft 33 of the automatic transmission 2, a lockup clutch 35 for locking the turbine-runner 34 up to the pump-impeller 32, and a stator 37 prevented from rotating in a one-way direction by a one-way clutch 37.

The automatic transmission 2 has a sub-transmission 38 for providing high and low gears, and a main-transmission 39 for enabling forward four gears and reverse one gear. The sub-transmission 38 comprises a planetary gear 40, a clutch C0, a one-way clutch F0 and a brake B0. Planetary pinions P0 are disposed between a sun gear S0 and a ring gear R0, and rotate while moving along the outer circumference of the sun gear S0. A planetary carrier K0 supports the shaft of each planetary pinion P0. The clutch C0 and the one-way clutch F0 are deposited between the sun gear S0 and the planetary carrier K0, and the brake B0 is deposited between the sun gear S0 and a housing 46 of the automatic transmission 2. A C0 sensor 47 detects the rotation speed of the clutch C0.

The main-transmission 39 comprises the first planetary gear 41, the second planetary gear 42 and the third planetary gear 43. The first planetary gear 41 has a sun gear S1, a planetary carrier K1, planetary pinions P1, and a ring gear R1. Each planetary pinion P1 supported by the planetary carrier K1 is disposed between the sun gear S1 and the ring gear R1, and rotates while moving along the outer circumference of the sun gear S1. Similarly, the second planetary gear 42 has a sun gear S2, a planetary carrier K2, planetary pinions P2, and a ring gear R2. Each planetary pinion P2 supported by the planetary carrier K2 is disposed between the sun gear S2 and the ring gear R2, and rotates while moving along the outer circumference of the sun gear S2. Furthermore, the third planetary gear 43 has a sun gear S3, a planetary carrier K3, planetary pinions P3, and a ring gear R3. Each planetary pinion P3 supported by the planetary carrier K2 is disposed between the sun gear S3 and the ring gear R3, and rotates while moving along the outer circumference of the sun gear S3.

These above-mentioned sun gears S1 and S2 are coupled together as a single-piece, and the planetary carriers K2, K3 and the ring gear R1 are coupled together. The planetary carrier K3 are coupled to an output shaft 44 of the automatic transmission 2. The ring gear R2 is coupled to the sun gear S3. Furthermore, the first clutch C1 is provided between an intermediate shaft 45 and the ring gear R2 coupled to the sun gear S3, and the second clutch C2 is provided between the intermediate shaft 45 and the sun gears S1, S2.

As a braking method, the first brake B1 for stopping rotation of the sun gears S1, S2 is deposited on the housing 46. In this case, the first brake B1 is a band type brake. The first one-way clutch F1 and the second brake B2 are provided in series between the housing 46 and the sun gears S1, S2. This first one-way clutch F1 functions to work when the sun gears S1, S2 begin to rotate in a reverse direction to the input shaft 33 (in this case the second brake B2 is locked).

The third brake B3 is provided between the planetary carrier K1 and the housing 46, and the fourth brake B4 and the second one-way clutch F2 are provided in parallel between the ring gear R3 and the housing 46. The second one-way clutch F2 prevents the ring gear R3 from rotating in reverse, and this condition can cause the automatic transmission 2 to be in the first gear. In an engine brake condition, the inner race of the one-way clutch F2 rotates freely with no torque transmission. Friction members of the above-mentioned clutches C0, C1, C2 and brakes B0, B1, B2, B3, B4 are controlled by pressure oil.

As mentioned above, the C0 sensor 47 detects the rotation speed of the clutch C0 in the sub-transmission 38. The rotation speed of the clutch C0 means the input rotation speed for the automatic transmission 2 in the $1^{st}$, $2^{nd}$, $3^{rd}$, and $4^{th}$ gears. Adding to this, a C2 sensor 48 is also deposited for detecting the rotation speed of the second clutch C2 in the main-transmission 39. Incidentally, these sensors 47, 48 are connected to the aforementioned T-ECU 4.

As mentioned above, in this automatic transmission 2 five gears are available in forward drive, and one reverse gear is available. The condition of each friction member for setting a gear shift is shown in FIG. 5. Incidentally, ○ means working, ⊚ means working without torque transmission, and ● means working for an engine brake. The blank indicates non-working.

Referring to FIG. 5, 'P' shows a parking range, 'Rev' shows a reverse range, 'N' shows a neutral range, and 'D' shows a drive range where any gear of all forward gears can be shifted and an engine brake is not working from the $1^{st}$ gear to $3^{rd}$ gear by means of the above-mentioned one-way clutches, F2, F0 and F1. In '4' in FIG.5, the automatic transmission can be shifted from the $1^{st}$ gear until the $4^{th}$ gear. In '3', the automatic transmission can be shifted from the $1^{st}$ gear until the $3^{rd}$ gear, and this $3^{rd}$ gear has an engine brake. In '2', the $1^{st}$ gear or the $2^{nd}$ gear are available and this $2^{nd}$ gear has an engine brake. 'L' shows that only the $1^{st}$ gear is available and this $1^{st}$ gear has an engine brake.

As shown in FIG. 2, many kinds of data detected by many kinds of sensors installed on the vehicle are inputted to the aforementioned E-ECU and T-ECU. They are, for example, the vehicle speed, the throttle angle θ, the accelerator angle ACC, engine revolutions Ne, turbine revolutions Nt of the torque converter 30, a signal from the brake switch, the shift pattern, a coolant temperature, an oil temperature, a signal from a stop lamp switch, a signal from a neutral start switch, etc. Both ECUs control the engine 1 and the automatic transmission 2 on the basis of these above-mentioned data by adding data from the navigation device 6.

When the vehicle is approaching an intersection or entering an area indicative of a down-shift, the T-ECU prevents the automatic transmission 2 from being shifted to a lower gear under a predetermined condition.

Initially, a case where a down-shift to the lowest gear is prohibited is explained by using the flowchart shown in FIG. 1A. First, whether a distance until an intersection is shorter than a predetermined distance is determined in step S1. This determination is executed by the navigation device 6. That is, on the one hand, the navigation device 6 detects the vehicle's position by the first and the second position detecting devices 10, 11; on the other hand, it reads the map information from the information recording mediums 7 and detects the distance remaining until the intersection on the scheduled course on the basis of the vehicle's position on the electronic map. Furthermore, a comparison of the detected distance with the predetermined distance is executed in step S1. The predetermined distance can be several tens of meters or only a few meters. Consequently, in step S1 whether the vehicle is close to the intersection or entering into the intersection can be detected. The function of this step S1 responds to the low speed condition detector in this invention.

When the result of the determination of step S1 is yes, then whether the present shift gear is the $2^{nd}$ gear or higher gear is determined in step S2. This can be done based on a gear-shift signal outputted from the T-ECU 4 and the vehicle speed signal detected by the vehicle speed sensor 15.

If this step S2 determines 'yes', there is a possibility that the vehicle is down-shifted to the lowest gear (the $1^{st}$ gear) near the intersection or in the intersection. In order to prevent this from happening, the control of prohibiting a down-shift to the $1^{st}$ gear is executed in step S3. In the T-ECU 4, this execution can be done by changing the shift pattern to the modified shift pattern without the $1^{st}$ gear, or by revising the detected vehicle speed. The function of step S3 responds to the prohibition means in this invention.

Next, whether the vehicle speed is lower than a predetermined speed or not is determined in step S4. This means the process that determines whether the above-mentioned one-way clutch F2 could work or be close to work, if the gear shift would be the $1^{st}$ gear under the power-off condition (that is, the deceleration condition). Consequently, the predetermined speed is close to zero. The function of the step S4 responds to the speed determinater in the invention.

If the result is 'no' in step S4, the step goes to the 'return'. In this case, the vehicle speed is higher than the speed where the one-way clutch F2 of the automatic transmission 2 is free, even if the shift-gear of the automatic transmission 2 could be the $1^{st}$ gear under the present vehicle speed condition. That is, the prohibition of the down-shift to the $1^{st}$ gear is maintained. Consequently, even if the accelerator pedal is pushed down after passing through the intersection or inside the intersection, the automatic transmission 2 is not down-shifted to the $1^{st}$ gear, and the vehicle is accelerated under the $2^{nd}$ gear, as it is. Since the one-way clutch F2 does not work suddenly from the free rotation condition, sudden torque fluctuation of the output shaft 44 does not occur. Consequently, a shock or vibration of the vehicle can be avoided.

On the contrary, when 'yes' is determined in step S4, the down-shift from the $2^{nd}$ gear or the higher gear to the $1^{st}$ gear is permitted in step S5. In this case, since the vehicle speed is close to stopping, the one-way clutch F2 is on standby. In other words the relative rotation speed between the inner race and the outer race of the one-way clutch F2 is nearly zero. To be more specific, the ring gear R3 of the third planetary gear 43 rotates at substantially zero speed. Consequently, since the one-way clutch F2 already works or is close to work, even though the accelerator pedal is pushed for the vehicle's acceleration, the output torque of the output shaft 44 does not fluctuate abruptly. Then, the accompanying shock at the acceleration after the deceleration of the vehicle is prevented or restrained. The function of step S5 responds to the permission means in this invention.

Incidentally, when 'yes' is determined in step S1, that is, when the distance until the intersection ahead is rather far from the present position, a normal shift control is executed in step S6. In the same way, when 'no' is determined in step S2, that is, when the automatic transmission 2 is in the $2^{nd}$ or the higher gear, or the vehicle is not decelerating, the normal shift control is executed in step S6. In other words, a gear shift is determined on the basis of a loaded condition of the engine 1 and the driving condition of the vehicle, and the determined gear shift is controlled.

Next, the flowchart in FIG. 1B shows the other shift control of the control device for the automatic transmission. The shift control of the flowchart shown FIG. 1B is similar to the shift control shown in FIG. 1A, except for a few points, for example, concerning steps S2 and S5. Therefore, only these differences are explained. In step S12 corresponding with the step S2, whether the automatic transmission 2 is in the $3^{rd}$ gear or higher gear and the vehicle is decelerating, is determined. As mentioned above, the engine brake does not work in the $2^{nd}$ gear in the 'D' range. Since a down-shift from the $3^{rd}$ gear is prohibited in step S13, the $3^{rd}$ gear is maintained even though the accelerator pedal is pushed down after passing through the intersection or inside the intersection. Consequently, the one-way clutch F0 for the engine brake in the $2^{nd}$ gear does not work suddenly from the free rotation condition. Then, the sudden torque fluctuation of the output shaft 44 does not occur, in other words a shock of the vehicle can be avoided.

In step S15, the down-shift to the $1^{st}$ gear is done after the vehicle speed is lower than a predetermined speed. In this case the vehicle speed is close to stopping. Consequently, the one-way clutch F2 is on standby. That is, the relative rotation speed between the inner race and the outer race of the one-way clutch F2. To be more specific, the ring gear R3 of the third planetary gear 43 rotates at nearly zero speed. Since the one-way clutch F2 already works or is close to work, even though the accelerator pedal is pushed for the vehicle's acceleration, the output torque of the output shaft 44 does not fluctuate abruptly. Then, the accompanying shock at acceleration after deceleration of the vehicle is prevented or restrained.

In this case, if the vehicle speed is lower than the predetermined speed, the down-shift from the $3^{rd}$ gear or higher gear to the $1^{st}$ gear is permitted in the step S15. It is also available, however, that the down-shift from the $3^{rd}$ gear or higher gear to the next lower gear is permitted.

Furthermore, the other shift control of the control device is shown in the flowchart in FIG. 1C. The shift control of the flowchart shown FIG. 1C is also similar to the shift control shown in FIG. 1A and 1B. Therefore, only the differences are explained as follows.

In step S22, whether the automatic transmission 2 is in the $4^{th}$ gear or higher gear, and whether the vehicle is decelerating is determined. As mentioned above, the engine brake does not work in the $3^{rd}$ gear in the 'D' range. Since a down-shift from the $4^{th}$ gear is prohibited in step S23, the $4^{th}$ gear is maintained even though the accelerator pedal is pushed down after passing through the intersection or inside the intersection. Consequently, the one-way clutch F1 for the engine brake in the $3^{rd}$ gear does not work suddenly from the free rotation condition. Then, the sudden torque fluctuation of the output shaft 44 does not occur, in other words a shock of the vehicle can be avoided.

In step S25 the down-shift to the $1^{st}$ gear is done, after the vehicle speed is lower than a predetermined speed. In this case the vehicle speed is close to stopping. Consequently, the one-way clutch F2 is on standby. That is, the relative rotation speed between the inner race and the outer race of the one-way clutch F2 is nearly zero. To be more specific, the ring gear R3 of the third planetary gear 43 rotates at substantially zero speed. Since the one-way clutch F2 already works or is close to work, even though the accelerator pedal is pushed for the vehicle's acceleration, the output torque of the output shaft 44 does not fluctuate abruptly. Therefore, the accompanying shock at acceleration after deceleration of the vehicle is prevented or restrained.

In this case, if the vehicle speed is lower than the predetermined speed, the down-shift from the $4^{th}$ gear or higher gear to the $1^{st}$ gear is permitted in step S25. It is also available, however, that the down-shift from the $4^{th}$ gear or higher gear to the next lower gear is permitted.

In the embodiment of the invention mentioned above, such an automatic transmission with a gear train as shown in FIG. 4 is exemplified. It is not limited to this type of an automatic transmission. It is available if an automatic transmission has a one-way clutch or a plurality of one-way clutches working under the condition of power-on. As the driving condition requiring a down-shift, an intersection is referred to in this embodiment. However, a road with a narrower width because of construction or other causes can be available. Besides, a navigation device is exemplified as means for detecting a vehicle's approach to such a driving environment, however, it is not limited to such a device. A means for detecting a driving environment by receiving a signal from a system deposited on the earth is also available. Furthermore, a method of detecting a driving environment on the basis of information from a radar device or a CCD camera installed on the vehicle is also available.

What is claimed is:

1. A control device for an automatic transmission, said automatic transmission having at least a one-way clutch and achieving a down-shift by applying said one-way clutch, comprising:

a driving environment detector for detecting a driving environment of a vehicle including said automatic transmission;

a low speed condition detector for detecting that the vehicle is approaching or entering into a place indicative of a down-shift of said automatic transmission; and prohibition means for prohibiting a down-shift caused by applying said one-way clutch when said low speed condition means detects that the down-shift is indicated.

2. The control device for an automatic transmission according to claim 1, wherein said prohibition means prohibits a down-shift when said low speed condition detector detects an intersection ahead of the vehicle.

3. The control device for an automatic transmission according to claim 1, wherein said prohibition means prohibits a down-shift when said low speed condition detector detects that a distance between the vehicle and an intersection ahead of the vehicle is less than a predetermined value.

4. The control device for an automatic transmission according to claim 1, wherein said prohibition means prohibits a down-shift when said low speed condition detector detects that the vehicle is approaching or entering into a place indicative of a down-shift of said automatic transmission and the vehicle is decelerating.

5. The control device for an automatic transmission according to claim 1, further comprising:

a speed determiner for determining whether the vehicle speed is lower than a predetermined speed; and permission means for permitting a down-shift to a next lower gear when said speed determiner determines that the vehicle speed is lower than said predetermined speed.

6. A control device for an automatic transmission, said automatic transmission having at least a one-way clutch and achieving a down-shift from the $2^{nd}$ gear to the $1^{st}$ gear by applying said one-way clutch, comprising:

a driving environment detector for detecting a driving environment of a vehicle including said automatic transmission;

a low speed condition detector for detecting that the vehicle is approaching or entering into a place indicative of a down-shift of said automatic transmission; and prohibition means for prohibiting a down-shift from the $2^{nd}$ gear to the $1^{st}$ gear when said low speed condition means detects that the down-shift is indicated.

7. The control device for an automatic transmission according to claim 6, wherein said prohibition means prohibits a down-shift from the $2^{nd}$ gear to the $1^{st}$ gear when said low speed condition detector detects an intersection ahead of the vehicle.

8. The control device for an automatic transmission according to claim 6, wherein said prohibition means prohibits a down-shift from the $2^{nd}$ gear to the $1^{st}$ gear when said low speed condition detector detects that a distance between the vehicle and an intersection ahead of the vehicle is less than a predetermined value.

9. The control device for an automatic transmission according to claim 6, wherein said prohibition means prohibits a down-shift from the $2^{nd}$ gear to the $1^{st}$ gear when said low speed condition detector detects that the vehicle is approaching or entering into a place requiring a down-shift of said automatic transmission and the vehicle is decelerating.

10. The control device for an automatic transmission according to claim 6, further comprising:

a speed determinater for determining whether the vehicle speed is lower than a predetermined speed; and permission means for permitting a down-shift to the $1^{st}$ gear when said speed determinater determines that the vehicle speed is lower than said predetermined speed.

11. A control method for an automatic transmission, said automatic transmission having at least a one-way clutch and achieving a down-shift by applying said one-way clutch, comprising:

detecting a driving environment of a vehicle including said automatic transmission;

detecting a low speed condition that the vehicle is approaching or entering into a place indicative of a down-shift of said automatic transmission; and prohibiting a down-shift caused by applying said one-way clutch when said low speed condition is detected and the down-shift is indicated.

12. The control method for an automatic transmission according to claim 11, further comprising:

prohibiting a down-shift when an intersection is detected ahead of the vehicle.

13. The control method for an automatic transmission according to claim 11, further comprising:

prohibiting a down-shift when a distance between the vehicle and an intersection ahead of the vehicle is less than a predetermined value.

14. The control method for an automatic transmission according to claim 11, further comprising:

prohibiting a down-shift when the vehicle is approaching or entering into a place requiring a down-shift of said automatic transmission and the vehicle is decelerating.

15. The control method for an automatic transmission according to claim 11, further comprising:

determining whether the vehicle speed is lower than a predetermined speed; and permitting a down-shift when the vehicle speed condition is lower than said predetermined speed.

16. A control method for an automatic transmission, said automatic transmission having a one-way clutch and achieving a down-shift from the $2^{nd}$ gear to the $1^{st}$ gear by applying said one-way clutch, comprising:

detecting a driving environment of a vehicle including said automatic transmission;

detecting a low speed condition that the vehicle is approaching or entering into a place indicative of a down-shift of said automatic transmission; and prohibiting a down-shift from the $2^{nd}$ gear to the $1^{st}$ gear when said low speed condition is detected and the down-shift is indicated.

17. The control method for an automatic transmission according to claim 16, further comprising:

prohibiting a down-shift from the $2^{nd}$ gear to the $1^{st}$ gear when an intersection is detected ahead of the vehicle.

18. The control method for an automatic transmission according to claim 16, further comprising:

prohibiting a down-shift from the $2^{nd}$ gear to the $1^{st}$ gear when a distance between the vehicle and an intersection ahead of the vehicle is less than a predetermined value.

19. The control method for an automatic transmission according to claim 16, further comprising:

prohibiting a down-shift from the $2^{nd}$ gear to the $1^{st}$ gear when the vehicle is approaching or entering into a place indicative of a down-shift of said automatic transmission and the vehicle is decelerating.

20. The control method for an automatic transmission according to claim 16, further comprising:

determining whether the vehicle speed is lower than a predetermined speed; and permitting a down-shift to the $1^{st}$ gear when the vehicle speed is lower than said predetermined speed.

* * * * *